Sept. 15, 1964  F. G. NICKL ETAL  3,148,457
TEACHING MACHINE
Filed Sept. 26, 1962  5 Sheets-Sheet 1

INVENTORS.
PAUL D. KILBURY JR.
FRANKLYN G. NICKL
BY
*R. E. Jeangue*
ATTORNEY

Sept. 15, 1964    F. G. NICKL ETAL    3,148,457
TEACHING MACHINE
Filed Sept. 26, 1962    5 Sheets-Sheet 2
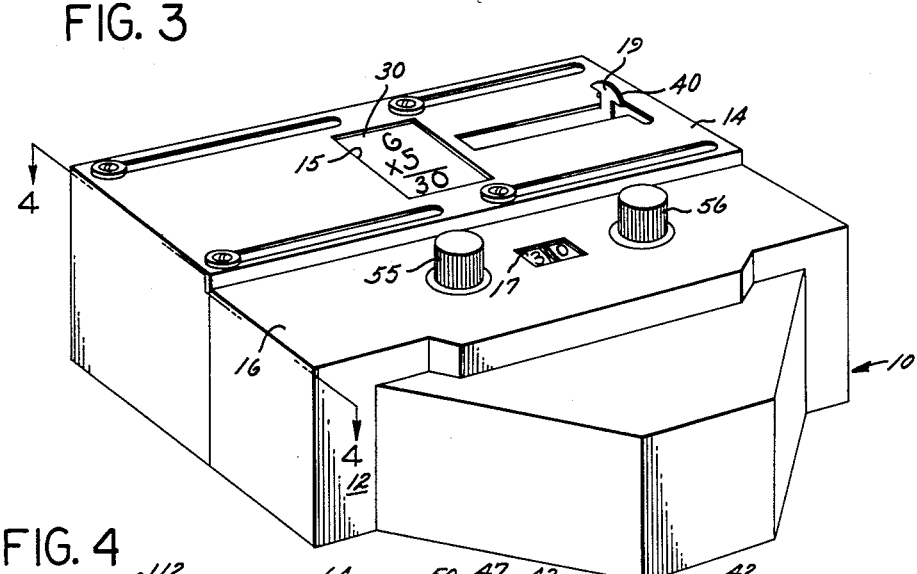
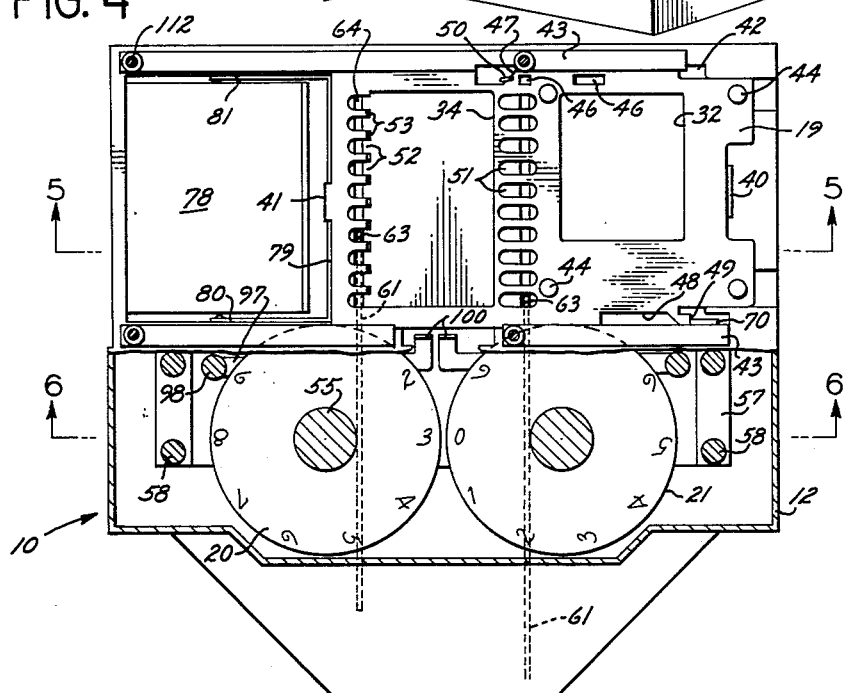
INVENTORS.
PAUL D. KILBURY JR.
FRANKLYN G. NICKL
BY
R.E. Geangue
ATTORNEY Sept. 15, 1964　　F. G. NICKL ETAL　　3,148,457
TEACHING MACHINE
Filed Sept. 26, 1962　　5 Sheets-Sheet 3
FIG. 5
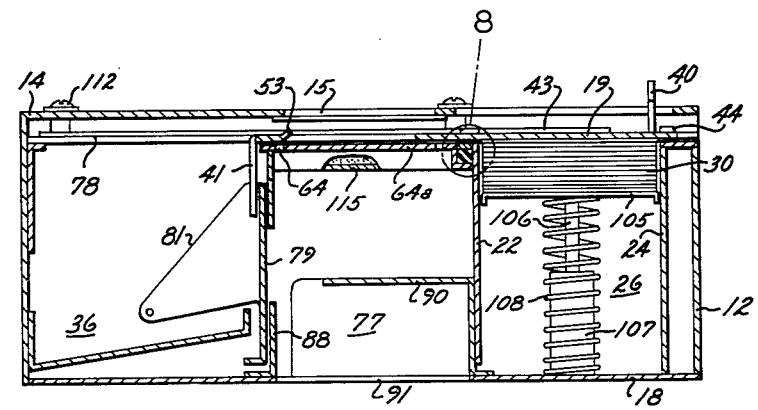
FIG. 6
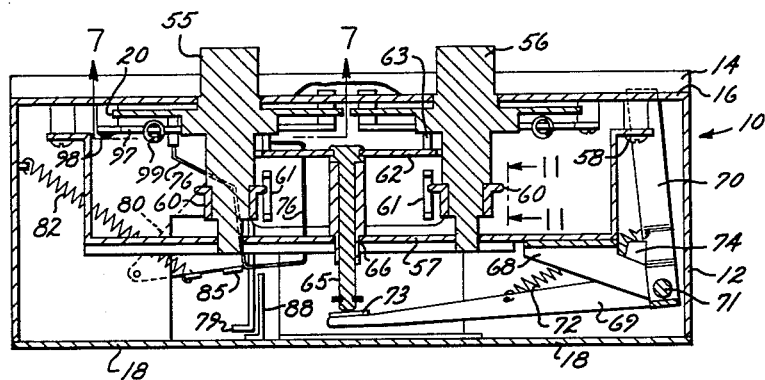
FIG. 7
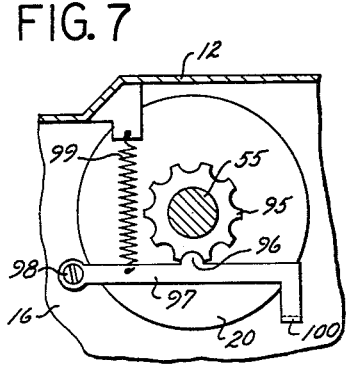
FIG. 8
FIG. 9
FIG. 10
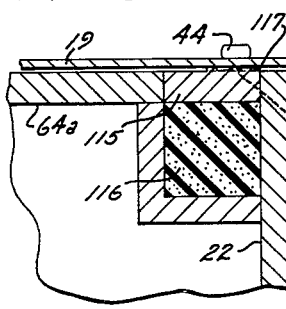
INVENTORS.
PAUL D. KILBURY JR.
FRANKLYN G. NICKL
BY
R. E. Geauque
ATTORNEY Sept. 15, 1964          F. G. NICKL ETAL          3,148,457
                         TEACHING MACHINE
Filed Sept. 26, 1962                         5 Sheets-Sheet 4

INVENTORS.
PAUL D. KILBURY JR.
FRANKLYN G. NICKL
BY
R. E. Geauque
ATTORNEY

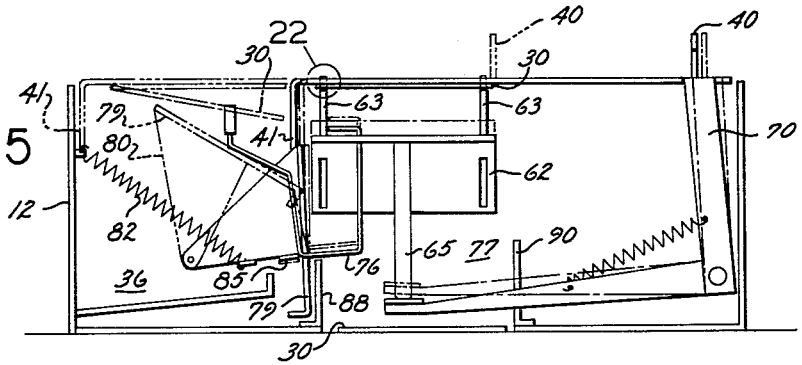
FIG. 15
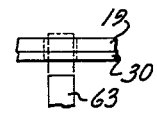
FIG. 22
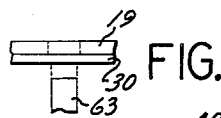
FIG. 23
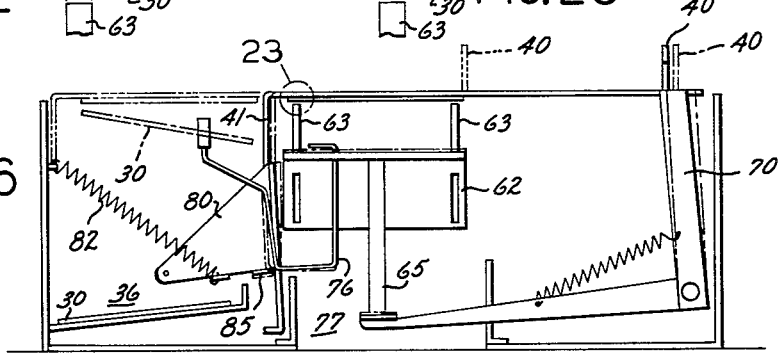
FIG. 16
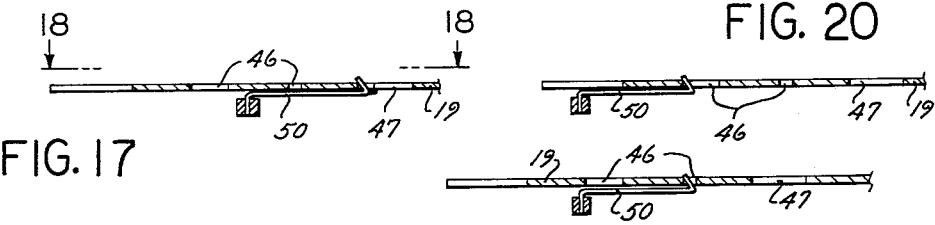
FIG. 17
FIG. 20
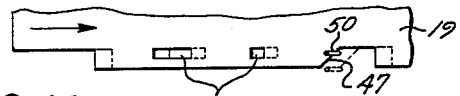
FIG. 18
FIG. 21
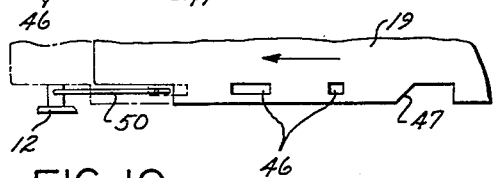
FIG. 19
INVENTORS.
PAUL D. KILBURY JR.
FRANKLYN G. NICKL
BY
ATTORNEY United States Patent Office 3,148,457
Patented Sept. 15, 1964

3,148,457
TEACHING MACHINE
Franklyn G. Nickl and Paul D. Kilbury, Jr., Santa Barbara, Calif., assignors to Nak Incorporated, Santa Barbara, Calif., a corporation of California
Filed Sept. 26, 1962, Ser. No. 226,336
12 Claims. (Cl. 35—9)

This invention relates to a teaching machine and to a method of teaching with such a machine and more particularly to an apparatus for and a method of teaching a student to associate one fact or set of facts with another fact presented to the student in a random manner and controlling the student so that he will follow a predetermined program.

It is well recognized that teaching machines and methods should include a program which is the desired method of going through prescribed lesson material and have means for and a method of controlling the student so that he will follow the program. The teaching machine of the present invention is of the type with which a student is taught to asociate one fact or set of facts with another fact. In teaching arithmetic, for example, a set of facts such as three and four is associated with the fact seven. The program consists, in this case, of presenting to the student in a random manner the set of facts three and four and having him set an answer which he believes to be correct and then allowing him to see the answer. The control consists of forcing him to choose an answer before he can see the correct answer and then sorting the wrong answers from the correct answers in such a manner that the instructor may readily see the errors that have been made. The student is forced to construct a response by being required to set dials to what he considers to be the correct answer. The student then compares his answer with the correct answer so that his response will be reinforced if he is correct or so that it will not be reinforced if he is incorrect. The reinforcement of a correct response is quite necessary to the learning process. The machine and method of the present invention are motivating influences since the student knows his responses may later be checked by the teacher. Also, the machine provides a means of concentrating attention and allows the student to proceed at his own natural pace. Flash cards are employed because of their high reliability in pairing facts, because they make it easy to randomize the order of programing, and because they facilitate changing the program.

With the machine and method of the present invention, cards are displayed to the student in such a manner that he can see the problem on the card but not the answer. The student rotates a dial or dials containing quite a number of choices of answers to what he considers to be the correct answer. The student then manipulates the machine in such a manner that the correct answer comes into view. This manipulation of the machine also causes mechanical sensing means to sense the cards in such a manner that cards which the student has correctly answered are subsequently distributed into a first bin, and cards which he has incorrectly answered are subsequently distributed into a second bin. When the machine is manipulated to permit the student to see the answer on the card, a safety mechanism prevents him from returning the machine to its original position for the purpose of changing his answer.

While apparatus and methods are available for teaching by associating one set of facts with another fact, they do have certain drawbacks. A number of them employ expensive optical systems for viewing small film images. A number of them employ strips of paper which present the problems and on which the student writes his answer, thus making it necessary for the instructor to scan the entire paper to pick up the incorrect answers. Also, a number of them employ complicated electrical circuits with the resultant hazards from shock or inconvenience of worn out batteries.

In view of the foregoing factors and conditions characteristic of teaching machines and methods of the prior art, it is a primary object of the present invention to provide a new and improved teaching machine and method not subject to the disadvantages enumerated above and wherein the machine is completely mechanical, which employs flash cards and which is very economical to manufacture while being highly efficient in use.

Another object of the invention is to provide a paired associates method of presenting a predetermined program in a random manner.

Still another object of the invention is to provide a teaching machine which employs flash cards to present a predetermined program in a random manner, which includes means of forcing the student to choose an answer before he can see the correct answer and which automatically sorts the cards during the examination so that all of the problems which have been incorrectly answered may be readily reviewed by the teacher.

A further object of the invention is to provide mechanical means in a teaching machine for sensing a card containing a problem which a student has answered and distributing the card to a first receptacle if the student's answer is correct or to a second receptacle if the student's answer is incorrect.

Yet another object of the invention is to provide an inexpensive teaching machine having mechanical means for automatically presenting one card at a time from a stack, eliciting a student response to a question on the card, displaying the correct answer to the student after the response, preventing the student from changing his answer, and distributing answered cards into predetermined piles.

Another object of the invention is to provide an improved method of coding cards in such a manner that simple mechanical means may be employed to sense the code and sort the cards into a correct answer stack or an incorrect answer stack.

These and other more specific objects will appear upon reading the following specification and claims and upon considering in connection therewith the attached drawings to which they relate.

Referring now to the drawings in which a presently preferred embodiment of the invention is illustrated:

FIGURE 3 is a perspective view showing the device of FIGURE 1 in a second operating position;

FIGURE 4 is a plan view, partially in cross-section, taken along the horizontal plane of line 4—4 of FIGURE 3;

FIGURE 5 is a cross-sectional view taken along line 5—5 of FIGURE 4;

FIGURE 6 is a cross-sectional view taken along line 6—6 of FIGURE 4;

FIGURE 7 is a transverse, cross-sectional view of a detail of construction on an enlarged scale taken along line 7—7 of FIGURE 6;

FIGURE 8 is a cross-sectional view on an enlarged scale of a detail of construction taken from within the area enclosed by circle 8 of FIGURE 5;

FIGURE 9 is a cross-sectional view of a detail of construction taken along line 9—9 of FIGURE 8;

FIGURE 10 is a cross-sectional view taken along line 10—10 of FIGURE 9;

FIGURE 15 is a somewhat schematic view of a portion of the internal construction of the teaching machine of the invention showing in broken lines the different positions of the parts employed therein during different stages of operation of the machine;

FIGURE 16 is a somewhat schematic view similar to FIGURE 15 showing the internal parts at additional stages of the operation of the machine;

FIGURE 17 is a cross-sectional view taken along line 17—17 of FIGURE 13;

FIGURE 18 is a plan view of a detail of construction taken along line 18—18 of FIGURE 17;

FIGURE 19 is a plan view of the parts shown in FIGURE 18 at a different stage in the operation of the machine;

FIGURE 20 is a cross-sectional view similar to FIGURE 17 showing the parts in a second operating position;

FIGURE 21 is a cross-sectional view similar to FIGURE 17 showing the parts in a third operating position;

FIGURE 22 is an enlarged detail of construction taken from the area enclosed by circle 22 of FIGURE 15; and FIGURE 23 is an enlarged detail of construction taken from the area within circle 23 of FIGURE 16.

Figure 1:
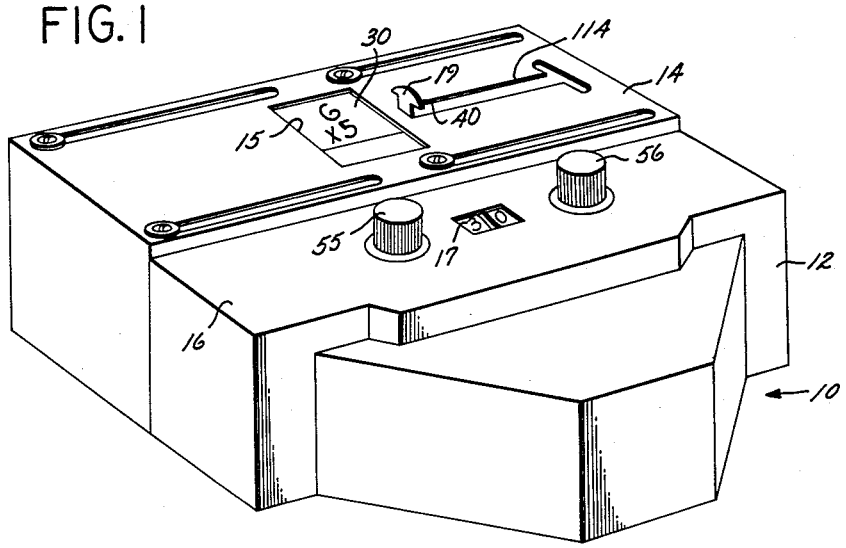
FIGURE 1 is a perspective view of a teaching machine of the invention shown in a first operating position.

Referring again to the drawings and particularly to FIGURES 1-6, the teaching machine constituting the present invention, generally designated 10, includes a housing 12 having a sliding, rear cover portion 14 which carries a window 15, a fixed front cover portion 16 which carries a window 17 and a bottom wall 18. A card transferring mechanism 19 is slidably mounted on the housing 12 subjacent the sliding cover 14 and slides with respect to both the housing 12 and the cover 14. Problem answering dials 20 and 21 each carry the numerals 0-9 and are rotatably mounted within the housing 12 in association with suitable means, to be hereinafter described, to prevent their operation after a student has set them in a predetermined manner to answer a problem. Upstanding partitions 22 and 24 are mounted in the housing 12 to form a card storage magazine 26 in which coded cards 30 are stored.

Figure 2:
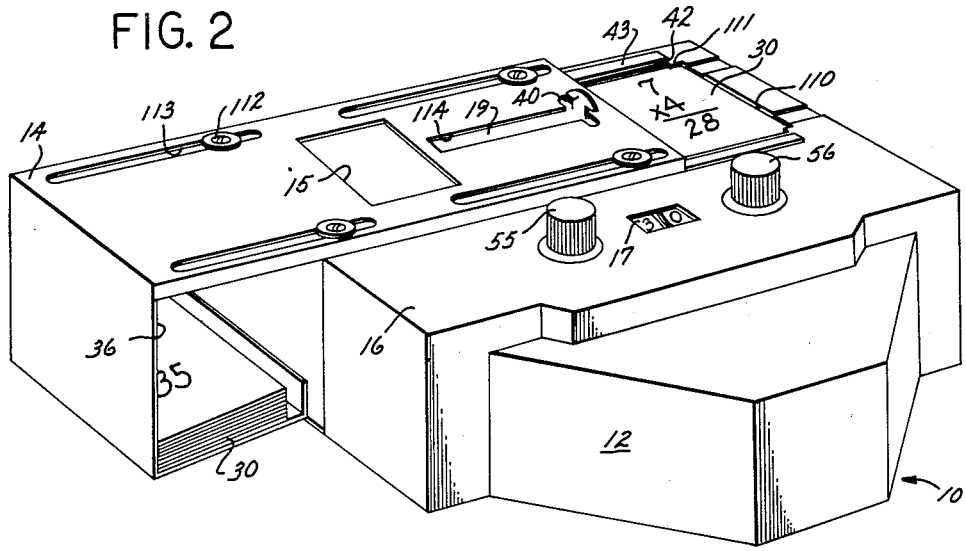
FIGURE 2 is a perspective view of the device of FIGURE 1 shown in its re-loading position.
Figure 11:
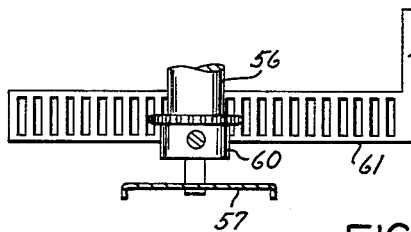
FIGURE 11 is an elevational view, on an enlarged scale, of a detail of construction taken in the plane of line 11—11 of FIGURE 6.

The card transferring mechanism 19 is employed to feed cards 30 from the magazine 26 into position under the window 15. In this position, a first opening 32 in the card transferring mechanism is aligned subjacent the window 15. The opening 32 is smaller than the window 15 so that the only portion of the card 30 visible through the window 15 is the portion containing the problem (FIGURE 1). The student operating the machine may then view the problem and set the answer thereto on the dials 20 and 21. He may then slide the card transferring mechanism 19 to the right, as viewed in FIGURES 3 and 4, leaving the card 30 in position under the window 15 and also under a second opening 34 which is mounted in the card transferring mechanism 19 and which corresponds in size to the window 15 so that the answer to the problem is visible to the student. At this point, the student is prevented from resetting the dials 20 and 21 and cannot operate the machine further until he slides the mechanism 19 to its extreme right hand position tripping a sensing mechanism which senses the card for either a correct or an incorrect answer. After the card is sensed, the student may then slide the mechanism 19 to the left, ejecting the answered card 30 into either a correct answer pile or an incorrect answer pile and bringing a new card 30 into position under window 15. When the student completes the deck of cards 30, the sliding cover 14 may be slid to the left, as seen in FIGURE 2, exposing a "wrong answer" magazine 36, making the incorrectly answered cards available to the instructor. The magazine 26 is also exposed and may be reloaded with new cards 30.

Referring now to FIGURES 4–5 and 8–10, the card transferring mechanism 19 also includes an upstanding projection 40 at one end which may be grasped by the student to operate the mechanism 19 and a depending member 41 at its other end and is slidably mounted on ways 42 on the upper surface of the housing 12. A plurality of retaining strips 43, which may be secured to the housing 12 by any suitable means, not shown, retain the mechanism 19 in position on the ways 42. A plurality of rivets 44 is affixed to the mechanism 19 and each rivet has a shaped face 45, which is disposed on the underside of the mechanism 19 and engages a card 30 when the mechanism 19 is slid to the left, as viewed in FIGURE 1, but slides over the card 30 when the mechanism 19 is slid to the right. A pair of apertures 46 and a cam face 47 are disposed along one edge of the mechanism 19 and the opposite edge of the mechanism 19 carries a recessed portion 48 and a bumper portion 49. The apertures 46 are adapted to be engaged by a safety catch 50 which is swingably mounted on the housing 12 and which selectively engages apertures 46 to prevent the mechanism 19 from moving to the left more than a predetermined amount until it has been moved to its extreme right hand position to cause the safety catch 50 to engage the cam face 47, which swings it out of the path of mechanism 19. As will become more apparent hereinafter, this prevents the student from viewing a correct answer at an improper time and from resetting the machine to change an incorrect answer. A row of slotted apertures 51 is mounted across the mechanism 19 intermediate the first opening 32 and the second opening 34 and a row of U-shaped apertures 52 is mounted across the mechanism 19 adjacent the edge of the second opening 34. The ends of the legs 53 of the apertures 52 are bent upwardly as shown in FIGURE 5, so that they will not snag on the card 30.

The dials 20 and 21 are affixed to knobs 55 and 56 which are rotatably mounted on a bracket 57 which, in turn, is rigidly affixed by means of screws 58 to the fixed cover 16 in such a manner that the knobs 55 and 56 will extend through the cover 16 for manipulation by the student and so that one numeral at a time from each dial 20 and 21 will be visible through the window 17. A pinion 60 is rigidly connected to each knob 55–56 at its lower end and is adapted to engage a respective rack 61 which is reciprocally mounted in a carrier 62. An upstanding sensing pin 63 is rigidly affixed to one end of each rack 61 and the racks and pins are aligned in such a manner that the pins 63 will reciprocate within slots 64 mounted in a card carrying platform 64a subjacent the mechanism 19. The carrier 62 is rigidly affixed to a shaft 65, which, in turn, is slidably mounted in an aperture 66 in the bracket 57 in such a manner that the carrier 62 may be raised and lowered as a unit, carrying the racks 61 and sensing pins 63 with it so that the sensing pins are free to extend upwardly through the slotted and U-shaped apertures 51 and 52, respectively, when they are in position superjacent the slots 64. As best seen in FIGURE 6, a depending bracket 68 is attached to the bracket 57 and carries first and second links or levers 69 and 70 which are pivotally connected thereto by means of a pin 71. The levers 69 and 70 are biased toward one another by a tension spring 72 and the first lever 69 includes a plate 73 which bears against the lower end of the shaft 65 and a protuberance 74 which engages the second lever 70. The second lever 70 extends upwardly through the housing 12 adjacent one way 42 and is adapted to be tripped by the bumper portion 49 when the mechanism 19 is slid to its extreme right hand position. When the lever 70 is tripped, a force is exerted on the shaft 65 through spring 72 and lever 69 to move the carrier 62 upwardly. The spring 72 permits the lever 70 to be pivoted to its stripped position even though the carrier 62 is prevented, by means to be hereinafter described, from reaching a maximum elevated position.

Figure 12:
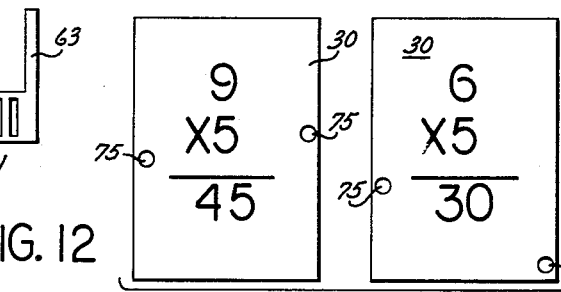
FIGURE 12 is a plan view of a random sample of cards employed with the teaching machine and method of the invention showing the coding means employed thereon.

As will be noted in FIGURE 12, each card 30 includes two apertures 75 which are placed thereon in a predetermined position. When the card 30 is moved into position under window 15 for the student to work the problem, the card is supported by the card platform 64a with the apertures 75 superjacent a respective slot 64. The apertures 75 are positioned on the card 30 in such a manner that, when the dials 20 and 21 are turned to expose a correct answer in window 17, the pinions 69 move the racks 61 to positions where the sensing pins 63 are disposed subjacent apertures 75. Then when the student slides the mechanism 19 to the right to view the answer printed on the card, the bumper 49 will engage the lever 70, lifting the carrier 62 upwardly carrying the sensing pins 63 with it through the apertures 75, thereby permitting a maximum upward movement of the carrier 62 which, as best seen in FIGURE 15, trips a latch 76. The latch 76 trips a mechanism, to be hereinafter described, which diverts the card 30 into a correct answer bin 77. Should, on the other hand, the student not attain a correct answer on either dial 20 or 21, the sensing pins 63, as best seen in FIGURES 16 and 23, are prevented by the card 30 from rising sufficiently to permit the carrier 62 to trip the latch 76. Consequently, the card diverting mechanism will not trip and the card will drop downwardly through an opening 78 in housing 12 into the wrong answer magazine or bin 36.

The mechanism which diverts the card 30 into the correct answer bin 77 or the wrong answer bin 36 comprises a platform 79 which is rigidly affixed to a pair of brackets 80 and 81. The brackets 80 and 81 are pivotally mounted within the housing 12 and are biased by a tension spring 82 which has one end attached to the bracket 80 and its other end attached to the housing 12. The spring 82 normally biases the platform 79 to the position shown in broken lines in FIGURE 15 when the slide mechanism 19 is extended to its left hand position, as also shown in broken lines in FIGURE 15. When the mechanism 19 is slid to the right, the depending projection 41 engages the platform 79 and swings it to a substantially vertical position, as shown in full lines in FIGURES 5, 15 and 16. In this position, a dog 85 on the bracket 81 engages the latch 76 which prevents the platform 79 from assuming its normal position under the tension of the spring 82 when the card transferring mechanism 19 is again slid to the left, unless the carrier 62 is elevated to its maximum height to engage the latch 76 and distort it sufficiently to bring it out of engagement with the dog 85. When either sensing pin 63 senses a "wrong answer" card, there will be at least one aperture 75 which is not aligned with a pin 63 so that the carrier 62 cannot assume its topmost position and will not, then, release the latch 76 thereby maintaining the platform 79 in its substantially vertical position even though the card transferring mechanism 19 is subsequently moved to its left hand position. Consequently, the wrong answer card 30 will drop directly into the wrong answer bin 36. Should the dials 20 and 21 be set to a correct answer, the sensing pins 63 will be disposed subjacent both apertures 75 in the card 30 so that upon subsequent movement of the mechanism 19 to its extreme right hand position to trip lever 70 and elevate the carrier 62, the sensing pins 63 will extend upwardly through the apertures 75 in the card 30, as shown in FIGURE 15, permitting the carrier to rise to its uppermost position where it engages the latch 76 swinging its lower end out of engagement with the dog 85 and permitting the platform 79 to assume the position shown in broken lines in FIGURE 15 so that a card 30 dropping from the machine 10 will slide down the platform 79 between the upstanding sidewall 83 and the top wall 90, into the correct answer bin 77. The bin 77 is disposed over an opening 91 in the bottom wall 18 of the housing 12 so that the cards may be retrieved by merely lifting the machine 10.

Referring now to FIGURES 4, 6 and 7, each dial 20 and 21 is controlled by a locking mechanism which includes an externally fluted cylindrical member or cog wheel 95 which is rigidly affixed to a respective knob 55–56 and which is engageable by a detent 96 to prevent rotation of the dials 20–21. Each detent 96 is an integral part of a lever 97 which is pivotally supported from the fixed cover 16 by a screw 98 and which is biased toward a respective fluted member 95 by means of a spring 99 having one end connected to the lever 97 and its other end connected to the housing 12. The end of each lever 97 remote from its screw 98 is L-shaped and includes an upstanding projection 100 adapted to engage the mechanism 19 and maintain the detent 96 in engagement with the fluted member 95 until the mechanism 19 is slid to the left, as viewed in FIGURE 4, sufficiently to bring the recessed portion 48 of the mechanism 19 into a position adjacent the projections 100 which will be relieved into the recessed portion 48 as the dials 20 and 21 are rotated. It is thus apparent that the only time a student can manipulate the dials is when the opening 32 is in position under the window 15, permitting the student to see the problem but not the answer, which is blocked by the solid portion of the mechanism 19 lying between the opening 32 and the recessed portion 48.

Referring again to FIGURE 5, the cards 30 are supported within the magazine 26 upon a card-supporting platform 105 which is rigidly affixed to a shaft 106 which, in turn, is reciprocally mounted within a hollow, cylindrical member 107. The hollow, cylindrical member 107 is rigidly affixed to the bottom wall 18 and a compression spring 108 encompasses both the cylindrical member 107 and the shaft 106 to bias the card-supporting platform 105 upwardly away from the bottom wall 18. As best seen in FIGURE 2, the cards 30 are disposed within an opening 110 in the housing 12 and are maintained in position therein against the pressure of the spring 108 by means of lips 111 which are mounted on the housing 12 adjacent the ends of the ways 42. The opening 110 is exposed by sliding the cover 14 to the left, thereby engaging the projection 40 on the card transferring mechanism 19 so that it slides along with the cover 14. The cover 14 is slidably mounted on the housing 12 by means of pins 112 which engage slots 113 in the cover 14. The projection 40 is mounted within a slot 114 in the cover 14 so that the mechanism 19 may be slid back and forth on the housing 12 while the cover 14 remains stationary.

When the mechanism 19 is slid to the position shown in FIGURE 5, the rivets 44 disposed across the end of the mechanism 19 engage a card 30 in such a manner that the card may be slid to the left, as viewed in FIGURE 5, when the mechanism 19 is slid to the left. As best seen in FIGURE 8, a bar 115 is mounted on a resilient pad 116 adjacent the partition 22 of magazine 26. The bar 115 includes a 45 degree ramp 117 and assures that only one card 30 is fed at a time from the magazine 26 by extending above the partition 22 so that it engages the undersurface of the mechanism 19 whereby a card engaging the rivets 44 will be pushed with sufficient force to depress the bar 115, while, on the other hand, the next lower card which is not in engagement with the rivets 44 will be stopped by the bar 115. The longitudinal edges of the card supporting platform 64a may also include bars 115 which impart a frictional drag to cards sliding across platform 64a.

Referring now to FIGURES 4, 7 and 11–12, a card 30, the dials 20 and 21, the pinions 60, the racks 61 and the sensing pins 63 must be coded and correlated together. The apertures 75 in the cards 30 are spaced in such a manner that when the dials 20 and 21 are set to a correct answer, the pinions 60 will move the racks 61 a corresponding amount to bring the sensing pins 63 in line with the apertures 75.

Operation of the device will be readily understood.

Figure 13:
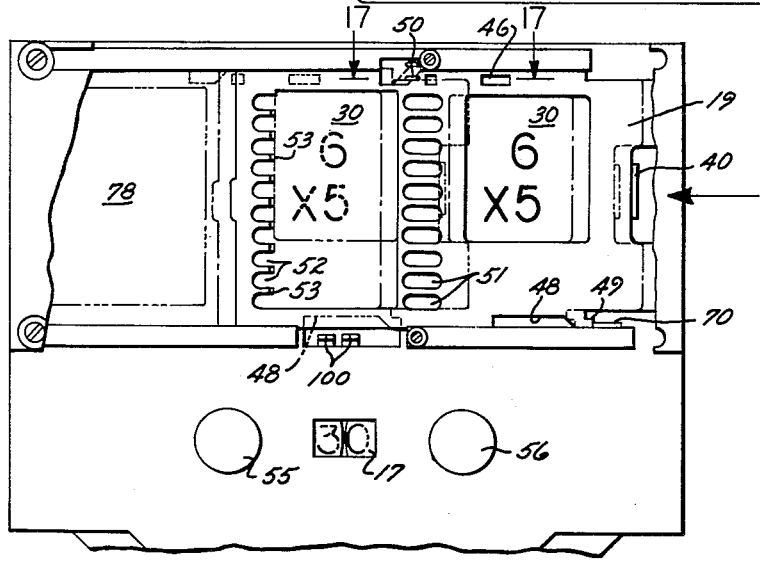
FIGURE 13 is a partial plan view of a machine of the invention with a portion of the cover broken away to show internal parts and employing a series of broken lines to show different operating positions thereof.
Figure 14:
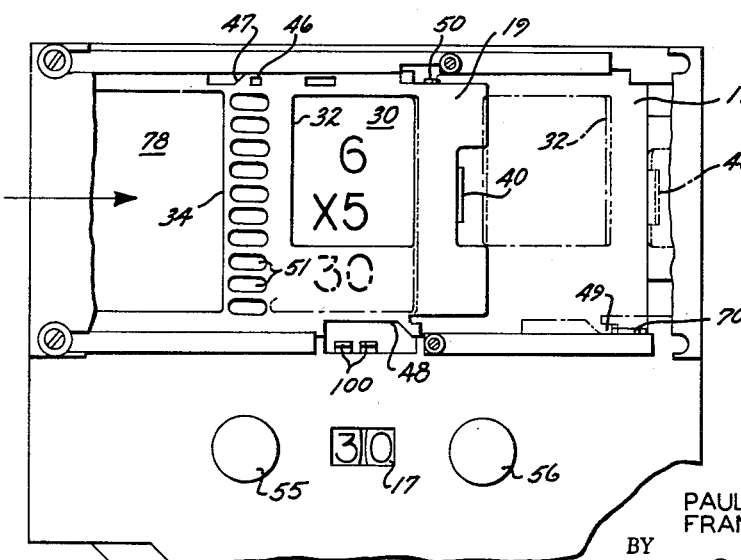
FIGURE 14 is a plan view similar to FIGURE 13 showing the machine in other stages of operation.

Assuming that a student is being taught the multiplication tables, cards 30 are arranged in a predetermined manner with the portions of the multiplication table that the student is to learn. The sliding cover 14 is moved to its extreme left hand position, shown in FIGURE 2, exposing the magazine 26 which may then be filled with the cards 30. The cover 14 is then slid back to the right to the position shown in FIGURE 1 and may be suitably locked in position, with means not shown, so that the student cannot remove it. The card transferring mechanism 19 is then slid to its extreme right hand position, as shown in solid lines in FIGURE 13, causing the rivets 44 to engage the top card in magazine 26. When the mechanism 19 is in this position, the safety catch 50 will be disposed upon the cam face 47 so that movement to the left will not be prevented. The student then slides the card transferring mechanism 19 to the left until the card 30 is in the position shown in broken lines in FIGURE 13 and in full lines in FIGURE 14 which places the card 30 under the window 15 (FIGURE 1), exposing the problem but not the answer. In this position, the recessed portion 48 of the mechanism 19 is disposed adjacent the projections 100 relieving them so that the knobs 55–56 may be rotated. Assuming that the student recognizes that the answer to the problem is 30 and sets 3 on the dial 20 and 0 on the dial 21, he then moves the mechanism 19 to the right to the position shown in the left hand set of broken lines in FIGURE 14, leaving the card 30 in position under the window 15 where the correct answer is visible through the second opening 34 and the window 15 (FIGURE 3). In this position, the catch 50 has not yet engaged the cam face 47; therefore, should the student attempt to move the mechanism 19 back to the left to reset the dials 20 and 21 in case of a wrong answer, the catch 50 will engage an aperture 46 and prevent further movement of the mechanism 19 to the left. Consequently, he must slide the mechanism 19 to its extreme right hand position, as shown in the right hand set of broken lines in FIGURE 14, causing the bumper 49 to engage the lever 70 and elevate the sensing pins 63 to sense the card 30. Since a right answer has been obtained, the pins 63 will extend upwardly into the apertures 75 in the card 30 permitting the carrier 62 to elevate to a position where it trips the latch 76 (FIGURE 15) releasing the card platform 79 so that it moves to the position shown in broken lines in FIGURE 15. The extreme right hand movement of mechanism 19 again brings the catch 50 into contact with the cam face 47 so that movement of the mechanism 19 to the left is not prevented. The student may then move the card transferring mechanism 19 to the left, picking up a new card 30 with the set of rivets 44 which are disposed across the end of the mechanism 19 and pushing the old card out from under the window 15 with the other set of rivets 44 so that it will drop through the opening 78 in the housing 12 and fall onto the platform 79 from whence it will be diverted into the correct answer bin 77. When the mechanism 19 is again slid to the right, the depending projection 41 will swing the platform 79 into its vertical position.

If the student has an incorrect answer, the carrier 62 will not elevate sufficiently to engage the latch 76 so that the platform 79 will remain in its vertical position and the card 30 will drop through the opening 78 into the wrong answer bin 36.

After the student answers all the cards in magazine 26, the cover 14 may be slid to the left to the position shown in FIGURE 2, exposing the magazine 26 for reloading and making the incorrectly answered cards in bin 36 available to the instructor for quick review. The correctly answered cards are retrieved from bin 77 by merely lifting the machine 10 off them.

While the particular teaching machine and method herein shown and described in detail are fully capable of attaining the objects and providing the advantages hereinbefore stated, it is to be understood that they are merely illustrative of the presently preferred embodiments of the invention and that no limitations are intended to the details of construction or design herein shown or to the details of the method herein described other than as defined in the appended claims.

We claim:

1. A teaching machine comprising:

a housing;

problem display means for displaying problem material and having a code corresponding to the correct answer to the problem;

a problem-material feeding mechanism mounted on said housing for positioning said display means and presenting the problem to a student;

an answer selection dial mounted in said housing for manipulation by said student to select an answer to the problem presented by said feeding mechanism;

a mechanical sensing mechanism responsive to said dial for comparing the selected answer with said code to sense the correctness of the answer selected on said dial; and problem-material distributing means mechanically connected to said sensing mechanism for actuation thereby to distribute the answered problem into a correct answer pile or into a wrong answer pile depending upon the correctness of the selected answer.

2. The teaching machine of claim 1 wherein said problem-material has correct answers displayed thereon and said feeding mechanism includes means for exposing said correct answer only after said student has manipulated said dial.

3. The teaching machine of claim 2 including a catch mechanism mounted in said housing adjacent said feeding mechanism, said catch mechanism engaging said feeding mechanism after said display means has been positioned thereby to lock said feeding mechanism against a second presentation of said problem after its answer has been disclosed to said student.

4. The teaching machine of claim 2 including brake means connected to said dial for preventing manipulation thereof after the correct answer to a said problem has been exposed.

5. A machine for teaching a student with flash cards having problems displayed thereon and having codes corresponding to the correct answers to said problems, said machine comprising:

a housing having a card storage magazine and a card supporting platform;

a card feeding mechanism mounted on said housing for feeding a card from said magazine to said platform to present a problem to said student;

an answer selection dial mounted in said housing for manipulation by said student to indicate an answer to the problem presented by the card positioned on said platform;

mechanical sensing means connected to said dial for comparing the selected answer with said code to sense the correctness of the answer selected on said dial; and a card sorting mechanism mechanically connected to said sensing means for actuation thereby to sort the answered card into a correct answer pile or into an incorrect answer pile depending upon the correctness of the selected answer.

6. The machine of claim 5 wherein said card feeding mechanism includes means for exposing the correct answer to a problem after an answer has been selected on said dial.

7. The machine of claim 6 including lock mechanism connected to said dial for preventing manipulation thereof after the correct answer has been exposed.

8. The machine of claim 7 including a catch mechanism mounted in said housing adjacent said feeding mechanism, said catch mechanism engaging said feeding mechanism to lock it against repositioning said card on said platform after an answer has been disclosed to said student.

9. A teaching machine for instructing a student with flash cards having problems and answers displayed thereon comprising:

a housing having a card storage magazine, a card displaying platform and a card distributing mechanism swingably mounted therein said card distributing mechanism being swingable to a first position to distribute said cards into a first pile and a second position to distribute said cards into a second pile;

resilient means connected to said card distributing mechanism for biasing it toward one of said positions;

a card feeding mechanism slidably mounted on said housing superjacent said magazine, said platform and said distributing mechanism for transferring cards from said magazine to said platform and said distributing mechanism;

an answer selecting mechanism mounted in said housing adjacent said platform for manipulation by said student to select answers to problems displayed on said platform by said cards;

mechanical sensing means mounted in said housing and connected to said answer selecting mechanism for sensing the correctness of answers selected by said student; and a latch mechanism connected to said sensing means said latch mechanism engaging said card distributing means to prevent it from swinging to said one position when one type of answer is selected and being moved out of engagement therewith when another type of answer is selected.

10. The teaching machine of claim 9 wherein said card feeding mechanism includes a first window positionable over said cards when they are in position on said platform to display only the problem, a second window positionable over said cards when they are in position on said platform to display the answer, a catch mechanism mounted in said housing adjacent said feeding mechanism, said catch mechanism engaging said feeding mechanism to prevent the transfer of a card to said distributing mechanism before said sensing means senses the correctness of the answer selected by manipulating said answer selecting mechanism, and stop means mechanically linked to said answer selecting mechanism to prevent manipulation thereof to change the answer selected for a particular problem after said answer has been displayed through said second window.

11. A teaching machine for teaching a student with flash cards having problems and answers displayed thereon comprising:

a housing having a card storage magazine, a card supporting platform, a card distributing magazine, and an answer selecting dial mounted therein, said dial being adapted to be manipulated to select answers to problems displayed on said cards;

a card transferring mechanism slidably mounted on said housing superjacent said card storage magazine, said platform and said card distributing magazine, said card transferring mechanism including a first set of protuberances for transferring said cards from said card storage magazine to said platform, a first window for disclosing only the problem displayed on said card when it is transferred to said platform by said first protuberances, a second window for disclosing the answer displayed on said card, stop means for preventing manipulation of said dial after said answer has been disclosed and a second set of protuberances for transferring cards from said platform to said card distributing magazine;

a gate swingably mounted in said card distributing magazine for sorting the cards transferred from said platform to said magazine;

a sensing pin slidably mounted in said housing adjacent said platform for sensing said cards;

first linkage means connecting said sensing pin to said dial for sliding said sensing pin to positions along said platform corresponding to answers selected on said dial;

apertures mounted in said cards in predetermined positions corresponding to the correct answers to problems displayed thereon, said apertures being in vertical alignment with said sensing pin only when said cards are in position on said platform and said dial has been manipulated to indicate a correct answer; and second linkage means connecting said sensing pin to said gate for swinging said gate to a predetermined position when said sensing pin is moved vertically upwardly through an aperture in a card.

12. In combination with a teaching machine including a housing having a window, a catch and answer-selecting means mounted therein, a lesson-material feeding mechanism slidably mounted on said housing subjacent said housing window for presenting problems and answers to a student, said feeding mechanism comprising:

a plate having a first window adapted to display only a problem through said housing window when said plate is slid to a first position, a second window adapted to display both a problem and its answer through said housing window, when said plate is slid to a second position, a recess mounted on said plate adjacent said first window for permitting actuation of said answer-selecting means when said first window is positioned subjacent said housing window, and an aperture and a cam face mounted on said plate, said aperture being engageable by said catch to prevent ejection of a problem from said machine before the answer selected for a particular problem has been sensed, said cam face being engageable by said catch to permit ejection of a problem from said machine after the selected answer has been sensed.

References Cited in the file of this patent

UNITED STATES PATENTS

| | | |
|---|---|---|
| 2,564,089 | Williams | Aug. 14, 1951 |
| 2,911,741 | Boyer | Nov. 10, 1959 |
| 2,965,975 | Briggs | Dec. 27, 1960 |